United States Patent
Hikmet et al.

(10) Patent No.: US 6,307,604 B1
(45) Date of Patent: *Oct. 23, 2001

(54) LIGHT SOURCE HAVING A LUMINESCENT LAYER

(75) Inventors: Rifat Hikmet, Eindhoven (NL); Ralf Raue, Aachen; Thomas Welker, Roetgen, both of (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/382,937

(22) Filed: Feb. 2, 1995

Related U.S. Application Data

(63) Continuation of application No. 08/086,812, filed on Jul. 2, 1993, now abandoned.

(30) Foreign Application Priority Data

Jul. 4, 1992 (DE) .................................................. 42 22 028

(51) Int. Cl.⁷ ......................... G02F 1/1335; G02F 1/1347

(52) U.S. Cl. ............................... 349/71; 349/98; 349/115; 349/176

(58) Field of Search ................................. 359/37, 53, 48, 359/63, 65, 66; 362/19; 349/69, 71, 74, 98, 115, 176

(56) References Cited

U.S. PATENT DOCUMENTS

| | | | |
|---|---|---|---|
| 3,669,525 | * 6/1972 | Adams et al. | 359/37 |
| 3,697,152 | * 10/1972 | Adams et al. | 359/37 |
| 4,073,571 | * 2/1978 | Grinberg et al. | 359/37 |
| 4,882,617 | * 11/1989 | Vriens | 359/49 |
| 4,900,133 | * 2/1990 | Berman | 359/36 |
| 5,016,985 | * 5/1991 | Kalmanash et al. | 359/36 |
| 5,089,883 | 2/1992 | Welker et al. | 358/60 |
| 5,193,015 | * 3/1993 | Shanks | 359/53 |
| 5,235,443 | 8/1993 | Barnik et al. | 359/37 |

FOREIGN PATENT DOCUMENTS

| 0154953 | 9/1985 | (EP) . | |
|---|---|---|---|
| 0302619 | * 2/1989 | (EP) | 359/65 |

OTHER PUBLICATIONS

Melamed et al "Selected Optical Properties of Mixtures of Cholesteric Liquid Crystals" Applied Optics–vol. 10, No. 5—May 1971—pp. 1103–1107.*

Adams et al. "Cholesteric Films as Optical Filters" Journal of Applied Physics—vol. 42—No. 10—Sep. 1971, pp. 4096–4098.*

Adams et al., "Lossless Polarizer" Xerox Disclosure Journal—vol. 1—No. 3—Mar. 1976—pp. 85–86.*

F. J. Kahn "Cholesteric Liquid Crystals For Optical Applications" Applied Physics Letters—vol. 18, No. 6—Mar. 1971—pp. 231–233.*

Philips Research Bulletin on Materials 1991, "Scanning tunnelling microscopy" pp. 5–16. No date.

* cited by examiner

Primary Examiner—Kenneth Parker
Assistant Examiner—Tai V. Duong
(74) Attorney, Agent, or Firm—Ernestine C. Bartlett; Norman N. Spain

(57) ABSTRACT

Light source having a luminescent layer (3,8) whose light is guided through an optical filter (5,9) comprising at least one cholesteric crystal layer (cholesteric filter).

6 Claims, 1 Drawing Sheet

LIGHT SOURCE HAVING A LUMINESCENT LAYER

This is an continuation of application Ser. No. 08/086,812, filed Jul. 2, 1993, now abandoned.

BACKGROUND OF THE INVENTION

The invention relates to a light source having a luminescent layer, whose light is guided through an optical filter.

Such a light source for use in a colour projection arrangement with three monochromatic cathodoluminescence light sources is known from DE-OS 38 36 955.

A multilayer interference filter, which concentrates the light radiation in the forward direction as a light collection filter, is arranged between a front substrate and a layer of luminescent material. Interference filters are difficult to manufacture. A significant problem is that the thickness of the individual layers should be maintained constant, which is an absolute requirement for a satisfactory operation.

OBJECTS AND SUMMARY OF THE INVENTION

It is an object of the invention to provide a light source with a filter which can be easily manufactured and produces low light losses.

This object is solved in that the optical filter comprises at least one cholesteric crystal layer (cholesteric filter).

Known cholesteric filters (cf. Philips Research Bulletin on Materials 1991, page 15, or EP-A 0 154 953) are transmissive to light which is circularly polarized in a given direction of rotation (for example, laevorotatory) within a selectable wavelength range, whereas the circularly polarized light is reflected in the opposite direction of rotation (for example, dextrorotatory). If the filter is used as a polarization filter, either the transmitted or the reflected light can be utilized, hence at most half the unpolarized entrance light. In the combination according to the invention of a luminescent narrow-band light source with a cholesteric polarisation filter, the light reflected by the cholesteric layer is depolarized by the luminescent layer and reflected back to the cholesteric layer, so that approximately half the quantity of this light passes through the cholesteric polarization filter as, for example laevorotatory polarised light. The rest of the light which is reflected back is again reflected towards the luminescent layer from which it is again depolarized and reflected back to the cholesteric layer. This process may be repeated many times in an analogue manner, so that, while allowing for unavoidable absorption losses, approximately 80% of the unpolarized entrance light is finally passed through the cholesteric polarization filter as, for example laevorotatory polarzed light. Such a polarization filter having a high share of polarized light which can be utilized is characterized in that the cholesteric filter comprises a dextrorotatory or a laevorotatory cholesteric layer in which the wavelength range, in which the transmitted light is polarized, is larger than the wavelength range of the luminescent light, the wavelength range of the cholesteric filter, in which perpendicularly incident light is polarized, and the wavelength. range of the luminescent light starting at approximately equal, low wavelengths.

The reflecting property of a luminescent layer provides the possibility of replacing the interference filter of the arrangement known from DE-OS 38 36 955 by a combination of two cholesteric layers polarized in opposite directions, which combination can be manufactured in a very simple manner. A corresponding solution according to the invention is characterized in that the cholesteric filter is a light collection filter comprising successively arranged cholesteric layers, one of which polarizes in a dextrorotatory sense and the other polarizes in a laevorotatory sense in the same wavelength range, the wavelength range for this combination of layers, in which perpendicularly incident light is completely reflected, being slightly above the wavelength range of the luminescent light.

It is advantageously possible to arrange a polarizing cholesteric filter according to the invention and a cholesteric light collection filter according to the invention one after the other and to superimpose their physical effects. A simple solution using two layers with the same effect is characterized in that the cholesteric filter comprises a first polarizing layer and a second polarizing layer having an opposite sense of rotation, in which the wavelength range, at which light passing through the first layer is polarized, is larger than the wavelength range of the luminescent light and, in the case of perpendicularly incident light, starts approximately at the same low wavelength as the wavelength range of the luminescent light, and in that the wavelength range, in which the second layer polarizing in the opposite sense of rotation polarizes perpendicularly incident light, is slightly above the wavelength range of the luminescent light.

An advantageous embodiment of the invention is characterized in that the light source forms part of a cathodoluminescent lamp for LCD-projection television (FIG. 3) in which a λ./4 element is arranged between the light source and the LCD element.

In accordance with a further advantageous embodiment, light sources according to the invention may form part of a flat colour display screen having a pattern of light sources of different colours. In a further embodiment the light sources may be arranged behind a substrate and a λ./4-element as well as an absorbing polarizer may be arranged in front of the substrate.

These and other aspects of the invention will be apparent from and elucidated with reference to the embodiment described hereinafter.

DESCRIPTION OF THE PREFERRED EMBODIMENTS

Figure 1:
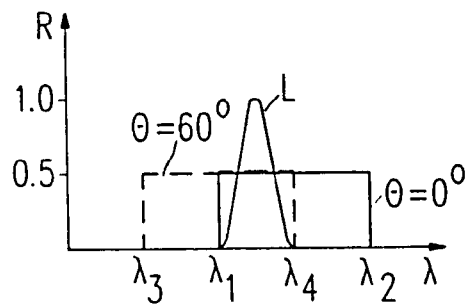
FIG. 1 show graphically the reflecting wavelength range of a cholesteric polarization filter relative to the wavelength range of a luminescent layer.

FIG. 1 shows the degree ofrefection R of a laevorotatory or dextrorotatofy polarizing cholesteric layer as a function wavelength of λ. In an ideal representation half the quantity of the incident unpolarized light is transmitted in a limited second wavelength range as light circularly polarized in a given direction of rotation, whereas the other half of the quantity of the incident light is reflected as light circularly polarized in the opposite direction. The positon of this wavelength range is dependent on the angle θ between the direction of the incident radiation and the normal on the cholesteric layer. For θ=0 there is a reflecting range between $λ_1$, and $λ_2$, for θ=60° the range is between $λ_3$ and $λ_4$. The characteristic curve L shows the wavelength-dependent relative intensity of the light incident on the cholesteric layer. The radiation of the luminescent layer is in a first wavelength range the wavelength range between $λ_1$ and $λ_4$ so that half the quantity of this radiation directly passes as polarized light through the cholesteric layer in the range of 60 °>θ>0. The reflected radiation is largely depolarized by luminescent layer and reflected back. Consequently, approximately half the quanity of the radiation which is reflected back can additionally pass through the cholesteric layer as circularly polarized light. The process of reflection from the cholesteric layer and the reflection back from the luminescent layer may be repeated several times so that, while allowing for unavoidable absorption losses, up to 80% of the unpolarized exit light passes through the cholesteric layer as circularly polarized light.

The width of the wavelength ranges $λ_1$–$λ_2$ and $λ_3$–$λ_4$ can be chosen in such a way that an at least predominant part of the spectrum of the luminescent layer between θ=0° and an angle θ located close to the radiation angle of the luminescent radiation (θ=60° in the example) is reflected. It is advantageous that the limit wavelength $λ_1$ for θ=0° is close to the smaller limit wavelength of the luminescent light. In accordance with FIG. 1 a light source for circularly polarized light is obtained in which up to 80% of the unpolarized exit light is converted into circularly polarized light instead of up to 50%, as with conventional polarizers.

Figure 2A:
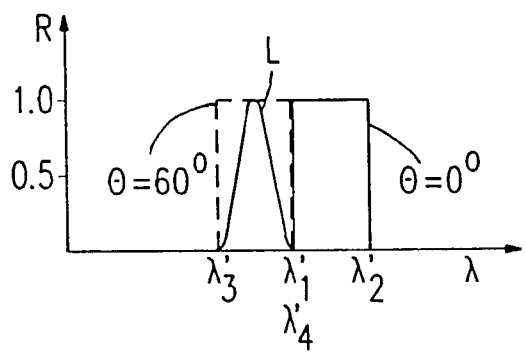
FIG. 2a shows graphically the reflecting wavelength range of a cholesteric light collection filter relative to the wavelength range of a luminescent layer.

FIG. 2a shows the degree of reflection of a successive arrangement of two cholesteric layers circularly polarizing in opposite directions for the angles θ=0 and θ=60°, analogous to FIG. 1. In contrast to FIG. 1 the wavelength range of the luminescent radiation L is outside, though close to a third wavelength range the wavelength range between $λ_1'$ and $λ_2'$ in which the two cholesteric layers reflect the complete light occurring at θ=0°. This means that luminescent light occurring at the angle θ=0° completely passes through the cholesteric layers. However, the reflecting range of the cholesteric layer in the case of radiation incident θ=60° is shifted between values of $λ_3'$ and $λ_4'$ so that radiation incident at θ>60° is initially completely reflected towards the luminescent layer. From this layer, it is, however, reflected back at angles of radiation predominantly in the range of 0 <θ>60° and can then pass through the cholesteric layers, while the process of reflection and backreflection can be repeated several times. In the final result the part of the luminescent radiation radiated at too large angles θ is converted into radiation having a considerably smaller angle θ with a high efficiency. For a satisfactory efficiency it is advantageous that the limit wavelengths $λ_3'$ and $λ_4'$ are possibly close to the limit wavelengths of the spectrum of luminescent radiation. As a consequence of the combination with a luminescent layer, the two cholesteric layers circularly polarizing in opposite directions act as a light collection filter having a high degree of transmissivity.

Figure 2B:
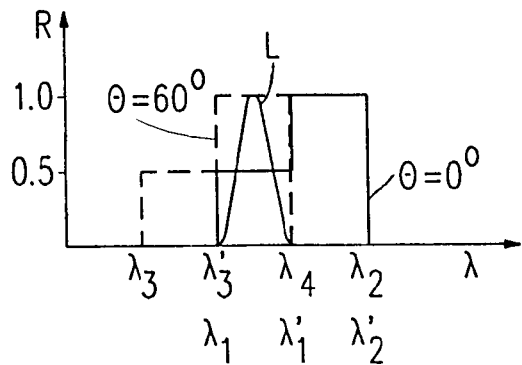
FIG. 2b shows graphically the degree of reflection of a combination of layers having polarinzation and collection properties.

In a layer arrangement according to FIG. 2b in connection with a luminescent layer, an optical filter is obtained which with a high efficiency simultaneously polarizes circularly and concentrates the exit light to a narrow radiation angular range in the forward direction. In FIG. 2b the degree of reflection in the case of perpendicularly incident light is shown in solid lines, whereas the degree of reflection at 60° is shown in broken lines. The characteristic curves shown are obtained when two cholesteric layers polarizingin opposite directions are superimposed. One of these layers is formed in accordance with FIG. 1 and the other is formed analogously to one of the layers in accordance with FIG. 2 The same designations are used for the limit values of the wavelengths.

Figure 3:
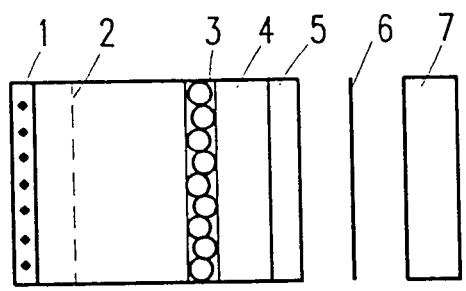
FIG. 3 shows diagrammatically in combination a cathodoluminescent light source, a quarter wave plate and an LCD.
Figure 4A:
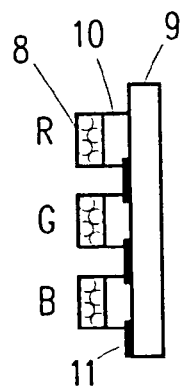
FIG. 4a shows diagrammatically a partial area of a flat colour display screen with integrated cholesteric light collection filters.
Figure 4B:
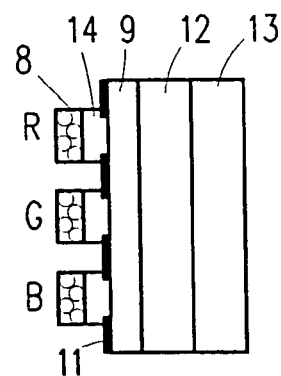
FIG. 4b shows diagrammatically a partial area of a flat colour display screen with integrated cholesteric filter which operate as illustrated in FIG. 2b and in which additional measures for absorption of ambient light have been taken.

FIGS. 3, 4a and 4b show examples of particularly advantageous uses of cholesteric filters according to the invention.

In accordance with FIG. 3, a cathodoluminescent light source (cf. DE-OS 38 36 955) comprises a cathode 1, a grid 2, a luminescent layer 3, a transparent substrate 4 and a three-layer cholesteric filter 5 in accordance with FIG. 2b. The cholesteric filter passes circularly polarzed light in a concentrated radiation beam via a λ/4 element 6 to an LCD device 7 with LCD cells which and are arranged in the form of a matrix and can be driven. The circularly polarized light by the λ4 element 6 is converted into linearly polarized light substantially without any loss, which linearly polarized light is required for driving the LCD cells of the LCD 7.

In the arrangement shown in FIG. 3 approximately 70% of the exit light of the luminescent layer is guided towards the LCD tube 7 instead of less than 50%, as in the known case. In the known case a required polarizer would in fact obstruct more than 50% and an interference filter would obstruct an additional part of the exit light.

FIG. 4a shows a partial area of a flat colour display screen. Such a display screen comprises interleaved grating-shaped patterns of red (R), green (G), and blue (B) luminescing pixels 8 which are selectively irradiated with electrons by means of cathode arrangements (for example, of the field emitter type) not shown (cf. PCT/US 87/01747).

Cholesteric filter elements 10 adapted to each "colour" are arranged between the common transparent substrate 9 and the pixels 8. The light of the luminescent pixels 8 passes through the grating apertures of the "black matrix" 11 and thence through the substrate 9. The "black matrix" 11 is used for attenuating ambient light from the exterior incident on the substrate 9.

The cholesteric filter elements have two layers in accordance with FIG. 2 and, similarly as an interference filter, enable a greater luminescence in the forward direction. However, in contrast to an interference filter, a cholesteric filter operating in a similar way can be manufactured much more easily. More specifically, the filter effect is substantially independent of variations of the layer thickness. It should of course be taken in account that temperatures of more than 200° C. should be avoided when manufacturing an arrangement comprising cholesteric layers, because the organic cholesteric layers would be destroyed at such high temperatures.

In a modification shown in FIG. 4b, the cholesteric filter elements 10 shown in FIG. 4a are replaced by cholesteric filter elements 14 in accordance with FIG. 2b. A λ/4 element 12 and a polarizer 13 are additionally provided. The λ4 element 12 converts the incident circularly polarized light into linearly polarized light. The polarizer 13 is arranged in such a way that this linearly polarized light is completely passed. On the other hand at most half the quantity of the exterior ambient light incident on the polarizer 13 can be reflected, while the rest is absorbed. Thus, a structure in which the effect of the "black matrix" is augmented is realized in a simple manner.

What is claimed is:

1. A light source having a luminescent layer, means for stimulating light emission from the layer in a first wavelength range, and a cholesteric filter comprising at least one cholesteric crystal layer for filtering the emitted light, characterized in that the cholesteric filter is a light collection filter comprising first and second successively arranged cholesteric crystal layers, the first of which polarizes light in a dextrorotatory sense and the second of which polarizes light in a laevorotatory sense, in the same wavelength range, the light collection filter completely reflecting perpendicularly incident light over a second wavelength range which is slightly above the first wavelength range of the luminescent light.

2. A light source as claimed in claim 1, characterized in that the luminescent elements of different colors, each of a pattern of luminescent elements of different colors, each of said luminescent elements emitting light in first wavelength ranges and each of the luminescent elements being provided with one of said cholesteric filters.

3. A light source as claimed in claim 1, in combination with a substrate (9) arranged in front of the light source, a $\lambda/4$ element (12) arranged in front of the substrate (9), and an absorbing polarizer (13) arranged in front of the $\lambda/4$ element characterized in that the luminescent layer defines a flat color display screen having a pattern of luminescent elements of different colors, each of said luminescent elements emitting light in said first wavelength range and each of the luminescent elements being provides with one of said cholesteric filters.

4. A light source as claimed in claim 1, characterized in that the luminescent layer defines a flat color display screen having a pattern of luminescent elements of different colors, each of said luminescent elements emitting light in first wavelength ranges and each of the luminescent elements being provided with one of said cholesteric filters.

5. A light source as claimed in claim 1, in combination with a an LCD matrix device for projection television, and a $\lambda/4$ element arranged between the light source and the LCD device.

6. A light source having a luminescent layer, means for stimulating light emission from the layer, a cholesteric filter comprising at, least one cholesteric crystal layer for filtering the emitted light, characterized in that the cholesteric filter comprises a first cholesteric crystal layer and a second cholesteric crystal layer having a sense of polarization rotation opposite to that of the first cholesteric layer, the first cholesteric crystal layer polarizing light in a first wavelength range and the second cholesteric crystal layer polarizing light in a second wavelength range, both ranges having approximately the same lower limits, the lower limit of the first wavelength range being approximately the same of the wavelength range of the luminescent light and the upper limit of the second wavelength range being slightly above that of the wavelength range of the luminescent light.

* * * * *